(12) United States Patent
Kanzaki

(10) Patent No.: US 11,453,215 B2
(45) Date of Patent: Sep. 27, 2022

(54) RECORDING APPARATUS

(71) Applicant: Brother Kogyo Kabushiki Kaisha, Nagoya (JP)

(72) Inventor: Shotaro Kanzaki, Handa (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 17/174,010

(22) Filed: Feb. 11, 2021

(65) Prior Publication Data

US 2021/0252854 A1 Aug. 19, 2021

(30) Foreign Application Priority Data

Feb. 13, 2020 (JP) .............................. JP2020-022451

(51) Int. Cl.
*B41J 2/045* (2006.01)
*B41J 2/145* (2006.01)

(52) U.S. Cl.
CPC ....... *B41J 2/04568* (2013.01); *B41J 2/04586* (2013.01); *B41J 2/145* (2013.01)

(58) Field of Classification Search
CPC ..... B41J 2/04568; B41J 2/04586; B41J 2/145
See application file for complete search history.

(56) References Cited

U.S. PATENT DOCUMENTS

| 8,721,017 | B2* | 5/2014 | Yamaguchi | B41J 2/04543 347/41 |
| 10,322,577 | B2 | 6/2019 | Yamaguchi et al. | |
| 10,723,124 | B2* | 7/2020 | Hasegawa | B41J 2/04505 |
| 2018/0065359 | A1 | 3/2018 | Yamaguchi et al. | |

FOREIGN PATENT DOCUMENTS

| JP | 2009-066882 A | 4/2009 |
| JP | 2018-041221 A | 3/2018 |
| JP | 2019-111688 A | 7/2019 |

* cited by examiner

*Primary Examiner* — Thinh H Nguyen
(74) *Attorney, Agent, or Firm* — Banner & Witcoff, Ltd.

(57) ABSTRACT

A recording apparatus includes a liquid ejection head, a relative displacement unit configured to cause the liquid ejection head and a recording medium to relatively displace in a relative displacement direction, and a controller. The liquid ejection head has two head units each having nozzles arranged in a nozzle arrangement direction intersecting with the relative displacement direction. The two head units are arranged such that some of the nozzles of the two head units overlap with each other in the relative displacement direction. When a recording command instructing to record an image on a recording medium is an instruction to record a specific image whose length in the nozzle arrangement direction is equal to or less than an arrangement range of the nozzles of the head unit, the controller controls the two head units to cause only one of the two head units to record the specific image.

13 Claims, 13 Drawing Sheets

SHEET-WIDTH DIRECTION
LEFT SIDE ⟷ RIGHT SIDE
↓ CONVEYING DIRECTION

SHEET-WIDTH DIRECTION
LEFT SIDE ⟷ RIGHT SIDE
↓ CONVEYING DIRECTION

SHEET-WIDTH DIRECTION
LEFT SIDE ⟷ RIGHT SIDE
↓ CONVEYING DIRECTION

SHEET-WIDTH DIRECTION
LEFT SIDE ⟷ RIGHT SIDE
↓ CONVEYING DIRECTION

RECORDING APPARATUS

CROSS-REFERENCE TO RELATED APPLICATION

This application claims priority under 35 U.S.C. § 119 from Japanese Patent Application No. 2020-022451 filed on Feb. 13, 2020. The entire subject matter of the application is incorporated herein by reference.

BACKGROUND

Technical Field

Aspects of the present disclosures relate to a recording apparatus configured to perform recording by ejecting liquid from one or more nozzles.

Related Art

As an example of the recording apparatus configured to perform recording by ejecting liquid from one or more nozzles, there has been known an image forming apparatus in which six short length heads each having a plurality of nozzles aligned in a width direction of a recording medium are arranged along the width direction of the recording medium. The short length heads that are closest to each other are arranged while shifting their positions with respect to each other in a conveying direction of the recording medium and such that some of their nozzles overlap in the conveying direction of the recording medium. The conventionally known image forming apparatus records an image on the recording medium by ejecting ink from the plurality of nozzles of the six short length head while conveying the recording medium.

SUMMARY

In the conventionally known image forming apparatus, there are cases where a conveying speed of the recording medium changes while recording an image on the recording medium in the manner described above due to, for instance, jamming or slipping of the recording medium. In such cases, misalignment in landing positions of ink droplets ejected from nozzles of short length heads on an upstream side in the conveying direction and landing positions of ink droplets ejected from nozzles of short length heads on a downstream side in the conveying direction may occur and may cause degradation in image quality of a recorded image.

According to aspects of the present disclosures, there is provided a recording apparatus including a liquid ejection head having a nozzle surface to which a plurality of nozzles are formed, a relative displacement unit configured to cause the liquid ejection head and a recording medium to relatively displace in a relative displacement direction parallel to the nozzle surface, and a controller. The liquid ejection head has two head units each having the nozzle surface to which the plurality of nozzles arranged in a nozzle arrangement direction intersecting with the relative displacement direction are formed. The two head units are arranged while shifting their positions with respect to each other in the relative displacement direction and the nozzle arrangement direction. Some of the nozzles of the two head units overlap with each other in the relative displacement direction within a particular overlapping range in the nozzle arrangement direction. When a recording command instructing to record an image on a recording medium is input, the controller controls the relative displacement unit to cause the liquid ejection head and the recording medium to relatively displace in the relative displacement direction and, at the same time, controls the two head units to eject liquid from the plurality of nozzles to record an image on the recording medium. When the recording command is an instruction to record, in an area of the recording medium including an area within the overlapping range in the nozzle arrangement direction, a specific image whose length in the nozzle arrangement direction is equal to or less than an arrangement range of the plurality of nozzles of the head unit, the controller controls the two head units to cause only one of the two head units to record the specific image.

BRIEF DESCRIPTION OF THE ACCOMPANYING DRAWINGS

DETAILED DESCRIPTION

First Embodiment

Hereinafter, a first embodiment of the present disclosures will be described.

Overall Configuration of Printer

Figure 1:
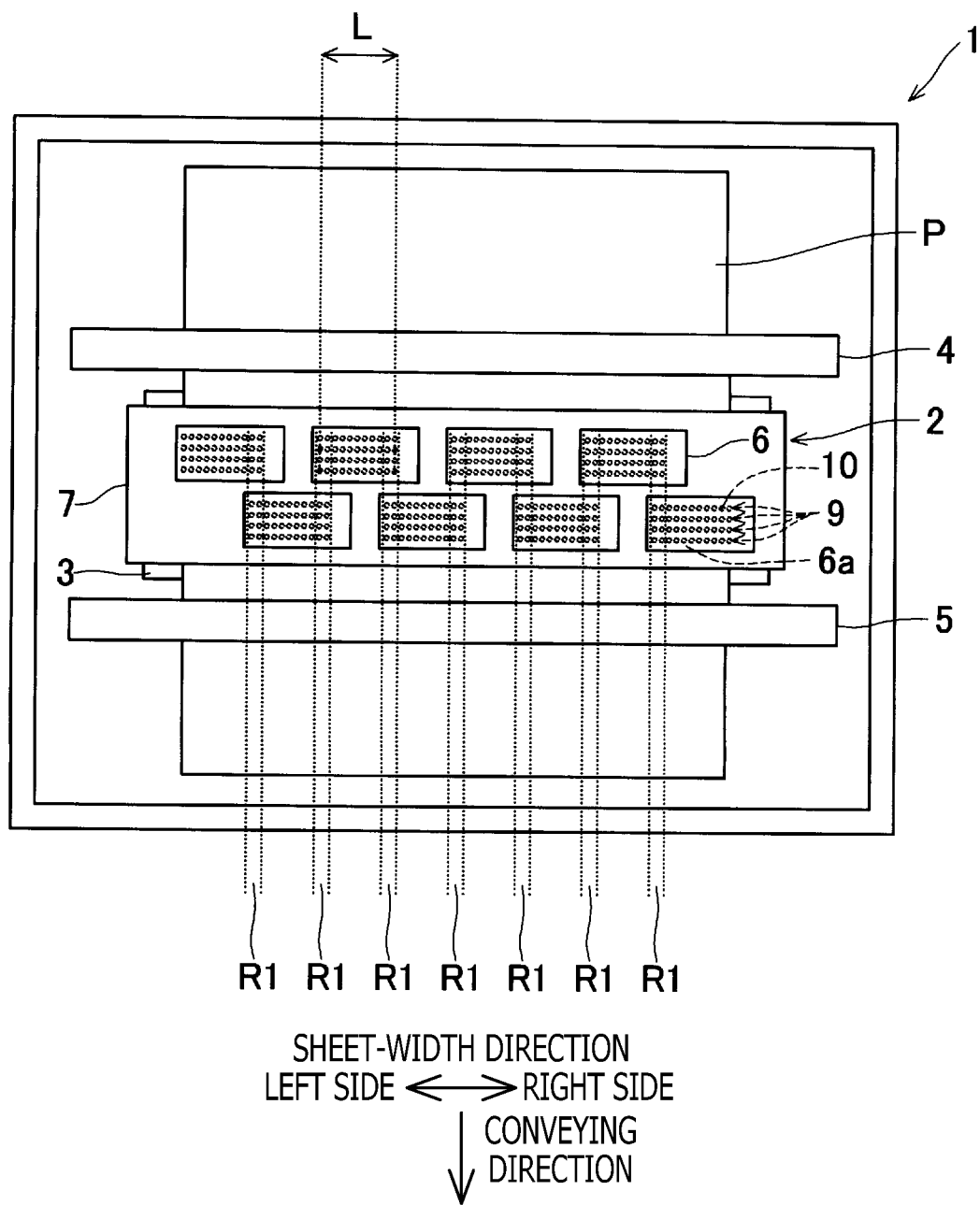
FIG. 1 is a schematic diagram of a printer according to a first embodiment of the present disclosure.

As shown in FIG. 1, a printer 1 according to the first embodiment includes an inkjet head 2, a platen 3 and conveying rollers 4 and 5. It is noted that the inkjet head 2 is an example of a liquid ejection head according to aspects of the present disclosures, and the conveying rollers 4 and 5 are examples of a relative displacement unit according to aspects of the present disclosures.

The inkjet head 2 includes eight head units 6 and a support member 7. Each head unit 6 is configured to eject ink from a plurality of nozzles 10 formed on a nozzle surface 6a which is a lower surface of the head unit 6.

The plurality of nozzles 10 are arranged in a horizontal sheet-width direction at particular nozzle intervals across a length L to form a nozzle row 9. It is noted that the sheet-width direction is an example of a nozzle arrangement direction according to aspects of the present disclosures. The head unit 6 has four nozzle rows 9 arranged in a conveying direction that is horizontal and orthogonal to the sheet-width direction. It is noted that the conveying direction is an example of a relative displacement direction according to aspects of the present disclosures. Positions of the nozzles 10 in each nozzle row 9 in the sheet-width direction are the same for all the four nozzle rows 9. The nozzles 10 configuring the first nozzle row 9, the nozzles 10 configuring the second nozzle row 9, the nozzles 10 configuring the third nozzle row 9 and the nozzles 10 configuring the fourth nozzle row 9 in an order from an upstream side to a downstream side in the conveying direction respectively eject black ink, yellow ink, cyan ink and magenta ink. Hereinafter, description will be made by defining a right side and a left side in the sheet-width direction as shown in FIG. 1.

Four of the eight head units 6 are aligned in the sheet-width direction to form a row of the head units 6, and the other four form another row of the head units 6. Thus, in the inkjet head 2, the two rows of the head units 6 each extending in the sheet-width direction are arranged in the conveying direction. That is, positions of the head units 6 configuring one of the two rows and positions of the head units 6 configuring the other of the two rows are shifted with respect to each other in the conveying direction.

Positions of the head units 6 configuring a row on the upstream side in the conveying direction and positions of the head units 6 configuring a row on the downstream side in the conveying direction are shifted with respect to each other in the sheet-width direction. Therefore, the head units 6 configuring the row on the upstream side in the conveying direction and the head units 6 configuring the row on the downstream side in the conveying direction overlap in the conveying direction within overlapping ranges R1 in the sheet-width direction, and the nozzles 10 of the head units 6 configuring the row on the upstream side in the conveying direction and positioned within the overlapping ranges R1 and the nozzles 10 of the head units 6 configuring the row on the downstream side in the conveying direction and positioned within the overlapping ranges R1 overlap in the conveying direction. The plurality of nozzles 10 of the eight head units 6 are thereby arranged across an entire length in the sheet-width direction of a recording sheet P. That is, the inkjet head 2 is a so-called line head. The support member 7 is a rectangular plate-like member whose longitudinal direction is parallel to the sheet-width direction and holds the eight head units 6 in the positional relationship described above. It is noted that the recording sheet P is an example of a recording medium according to aspects of the present disclosures. It is also noted that two of the eight head units 6 overlapping in the conveying direction within each overlapping range R1 are examples of two head units according to aspects of the present disclosures.

The platen 3 is disposed below the inkjet head 2. The platen 3 extends across the entire length of the inkjet head 2 in the sheet-width direction. The platen 3 supports the recording sheet P onto which recording is in progress.

The conveying roller 4 is disposed on the upstream side in the conveying direction with respect to the inkjet head 2 and the platen 3. The conveying roller 5 is disposed on the downstream side in the conveying direction with respect to the inkjet head 2 and the platen 3. The conveying rollers 4 and 5 are connected to a conveying motor 86 (See FIG. 2.) via conventionally known gears or the like. As the conveying motor 86 is driven, the conveying rollers 4 and 5 rotate and the recording sheet P is conveyed in the conveying direction. The inkjet head 2 and the recording sheet P thereby relatively displace in the conveying direction.

Electrical Configuration of Printer

Figure 2:
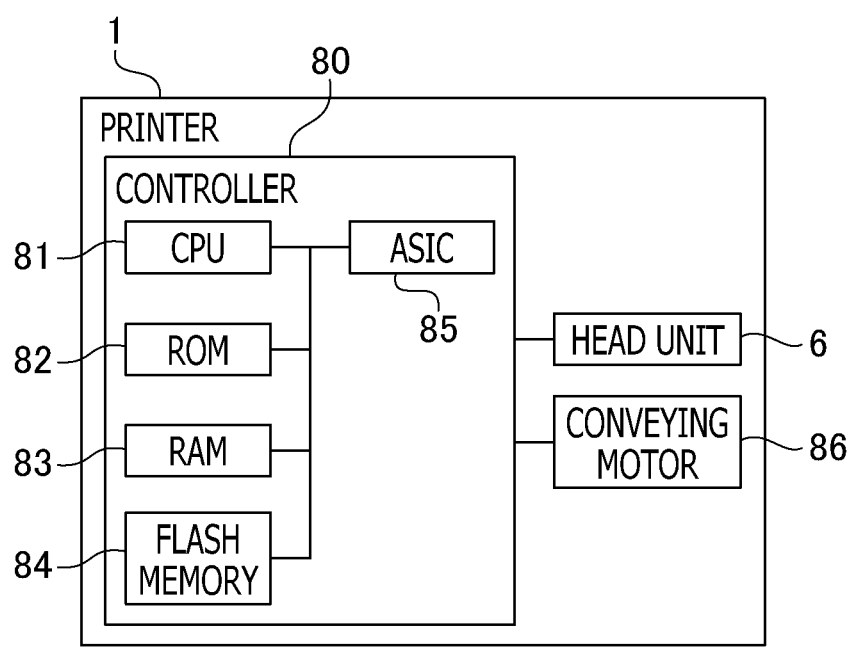
FIG. 2 is a block diagram showing an electrical configuration of the printer according to the first embodiment of the present disclosure.

Next, an electrical configuration of the printer 1 will be described. As shown in FIG. 2, the printer 1 includes a controller 80 and operations of the printer 1 are controlled by the controller 80. The controller 80 includes a CPU (Central Processing Unit) 81, a ROM (Read Only Memory) 82, a RAM (Random Access Memory) 83, a flash memory 84, an ASIC (Application Specific Integrated Circuit) 85 and the like and controls operations of the head units 6 and the conveying motor 86.

The controller 80 may be configured such that the CPU 81 and the ASIC 85 independently execute processes or such that the CPU 81 and the ASIC 85 cooperate to execute processes. The controller 80 may include only one CPU 81 and the only one CPU 81 may independently execute processes, or the controller 80 may include a plurality of CPUs 81 and the plurality of CPUs 81 may share processes. The controller 80 may include only one ASIC 85 and the only one ASIC 85 may independently execute processes, or the controller 80 may include a plurality of ASICs 85 and the plurality of ASICs 85 may share processes.

Control for Recording

Figure 3:
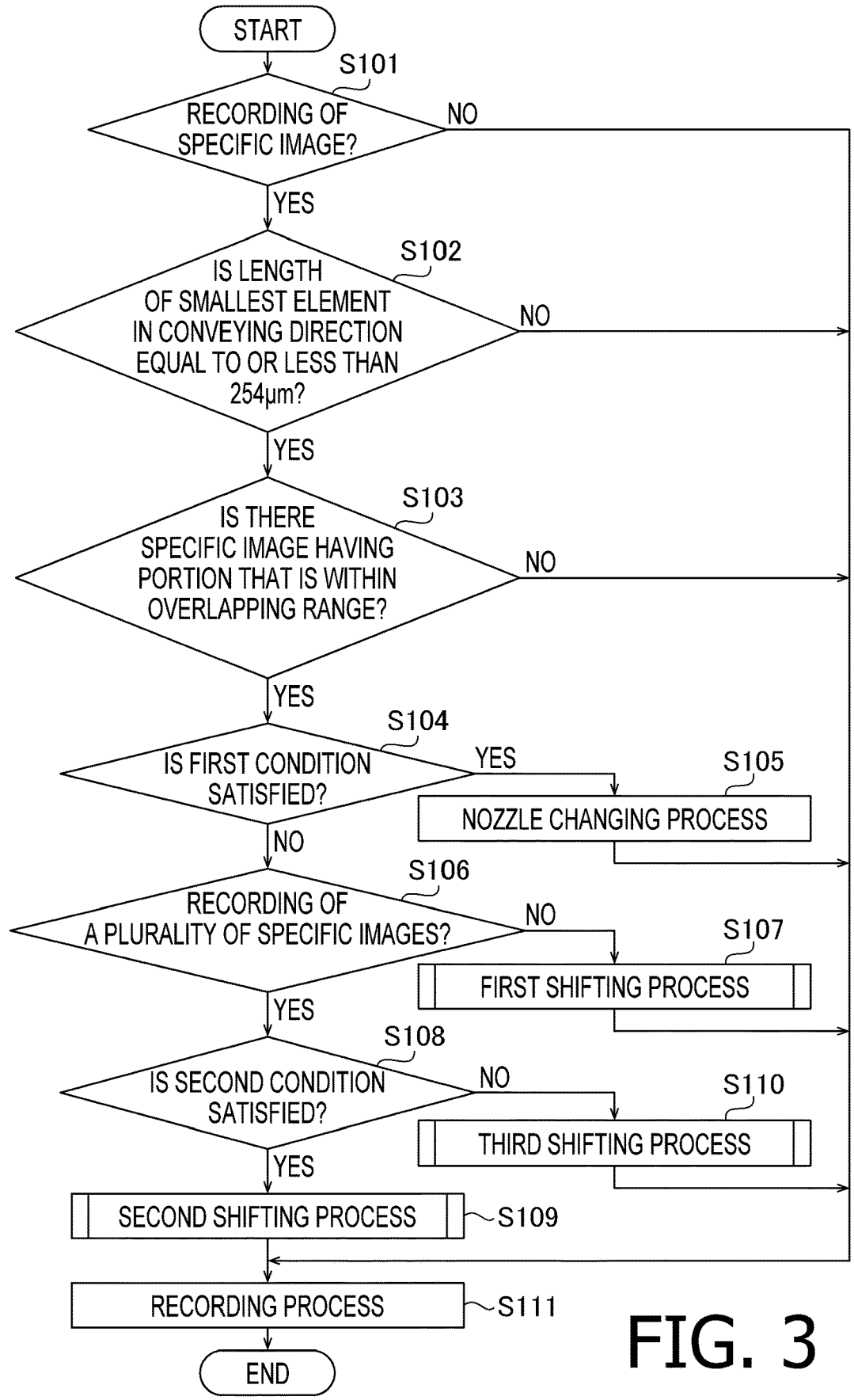
FIG. 3 is a flowchart illustrating processes to be executed by the printer according to the first embodiment of the present disclosure when executing recording.

Next, a flow of processes for recording an image with the printer 1 will be described. When a recording command instructing to execute recording of an image is input, the controller 80 executes processes in accordance with a flow shown in FIG. 3.

When the recording command is input, the controller 80 firstly determines whether or not the recording command is a command to record a specific image on the recording sheet P (S101). In the first embodiment, the specific image is a barcode or two-dimensional code whose length in the sheet-width direction is equal to or less than the length L of the nozzle rows 9.

If the recording command is not a command to record a specific image on the recording sheet P (S101: NO), the controller 80 proceeds to S111. If the recording command is a command to record a specific image on the recording sheet P (S101: YES), the controller 80 determines whether or not a length in the conveying direction of a smallest element of the specific image is equal to or less than a particular length which is, in the present embodiment, 254 μm (S102). In case the specific image is a barcode, the smallest element of the specific image is a bar configuring the barcode. In case the specific image is a two-dimensional code, the smallest element of the specific image is a cell configuring the two-dimensional code. In case the specific image is a barcode, the length of the smallest element of the specific image is a smallest width of the bars configuring the barcode. In case the specific image is a two-dimensional code, the length of the smallest element of the specific image is a smallest length of the cells configuring the two-dimensional code.

If the length in the conveying direction of the smallest element of the specific image is longer than 254 μm (S102: NO), the controller 80 proceeds to S111. If the length in the conveying direction of the smallest element of the specific image is equal to or less than 254 μm (S102: NO), the controller 80 determines whether or not there is a specific image having a portion that is within one of the overlapping ranges R1 in the sheet-width direction (S103).

In case the recording command is a command to record one specific image on the recording sheet P, in S103, the controller 80 determines whether or not the one specific image has a portion that is within one of the overlapping ranges R1 in the sheet-width direction. On the other hand, in case the recording command is a command to record a plurality of specific images on the recording sheet P, in S103, the controller 80 determines whether or not the plurality of specific images includes a specific image that has a portion that is within one of the overlapping ranges R1 in the sheet-width direction. The case where a plurality of specific images are to be recorded on the recording sheet P is, for instance, a case where the recording sheet P onto which a plurality of specific image is recorded is to be used by cutting for every specific image.

If there is no specific image having a portion that is within one of the overlapping ranges R1 in the sheet-width direction (S103: NO), the controller 80 proceeds to S111. If there is a specific image having a portion that is within one of the overlapping ranges R1 in the sheet-width direction (S103: YES), the controller 80 determines whether or not a first condition is satisfied (S104).

The first condition is a condition in which the specific image is entirely within a range of the nozzle rows 9 (a range where the nozzles 10 are arranged) in the sheet-width direction of one of the two head units 6 corresponding to the one of the overlapping ranges R1. If the recording command is a command to record one specific image, the first condition is a condition in which the one specific image is entirely within a range of the nozzle rows 9 of one of the two head units 6 corresponding to the one of the overlapping ranges R1. If the recording command is a command to record a plurality of specific images, the first condition is a condition in which every specific image having a portion that is within one of the overlapping ranges R1 in the sheet-width direction is entirely within the range of the nozzle rows 9 of one of the two head units 6 corresponding to the one of the overlapping ranges R1. In S104, for example, the controller 80 performs the above-described determination based on one or more recording positions of one or more specific images indicated by image data input along with the recording command and positions of the overlapping ranges R1 of respective head units 6 stored in the ROM 82 or the like in advance.

If the first condition is satisfied (S104: YES), the controller 80 executes a nozzle changing process (S105) and proceeds to S111. In the nozzle changing process of S105, the controller 80 executes processes in accordance with a flow shown in FIG. 4A for every specific image having a portion that is within the overlapping range R1 in the sheet width direction.

If the recording position of the specific image is entirely within the range of the nozzle rows 9 of the head unit 6 on the left among the two head units 6 corresponding to the one of the overlapping ranges R1 in the sheet-width direction (S201: YES), in the one of the overlapping ranges R1, only the nozzles 10 of the head unit 6 on the left among the two head units 6 corresponding to the one of the overlapping ranges R1 are set as the nozzles to be used for the recording of the specific image (S202).

If the recording position of the specific image is not entirely within the range of the nozzle rows 9 of the head unit 6 on the left among the two head units 6 corresponding to the one of the overlapping ranges R1 in the sheet-width direction (S201: NO), in the one of the overlapping ranges R1, only the nozzles 10 of the head unit 6 on the right among the two head units 6 corresponding to the one of the overlapping ranges R1 are set as nozzles to be used for the recording of the specific image (S203).

The nozzles to be used in the overlapping ranges R1 are set such that, in case the process for changing the setting of the nozzles to be used at S202 or S203, or S303, S305, S402 or S510 which will be describe later, is not executed, in the overlapping ranges R1, the nozzles to be used are evenly assigned to the two head units 6 corresponding to respective overlapping ranges R1. Since the assignment of the nozzles to be used to the two head units 6 corresponding to each of the overlapping ranges R1 is well known, detailed description of the assignment is herein omitted.

Figure 6A:
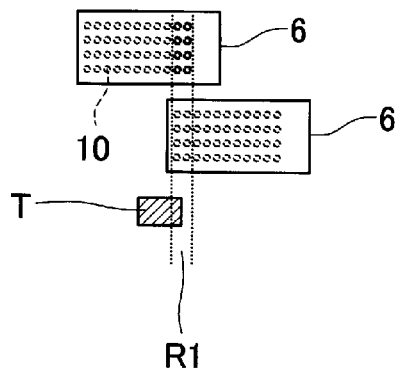
FIG. 6A illustrates a case where, in the nozzle changing process, nozzles of a head unit on the left are to be set as nozzles to be used in an overlapping range.

When the nozzle changing process described above is executed, for example, in case a specific image T has a portion that is within the overlapping range R1 in the sheet-width direction and is within the range of the nozzle rows 9 of the head unit 6 on the left among the two head units 6 corresponding to the overlapping range R1 such as a case shown in FIG. 6A (S201: YES), in the overlapping range R1, the nozzles 10 of the head unit 6 on the left among the two head units 6 corresponding to the overlapping range R1 are set as the nozzles to be used for the recording of the specific image T (S202). In FIG. 6A, and in FIGS. 6B, 7A, 7B, 8A, 8B and 9A to 9C which will be described later, the nozzles 10 to be set as the nozzles to be used are drawn with bold lines.

Figure 6B:
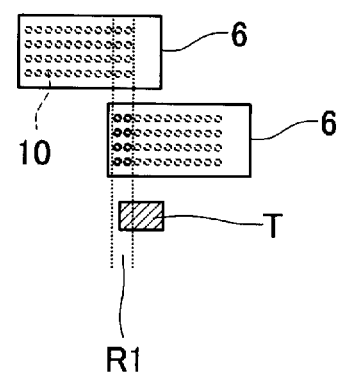
FIG. 6B illustrates a case where, in the nozzle changing process, nozzles of a head unit on the right are to be set as the nozzles to be used in the overlapping range.

On the other hand, for example, in case the specific image T has a portion that is within the overlapping range R1 in the sheet-width direction and is within the range of the nozzle rows 9 of the head unit 6 on the right among the two head units 6 corresponding to the overlapping range R1 such as a case shown in FIG. 6B (i.e., the specific image T is not within the range of the nozzle rows 9 of the head unit 6 on the left among the two head units 6 corresponding to the overlapping range R1) (S201: NO), in the overlapping range R1, the nozzles 10 of the head unit 6 on the right among the two head units 6 corresponding to the overlapping range R1 are set as the nozzles to be used for the recording of the specific image T (S203).

Referring back to FIG. 3, if the first condition is not satisfied, that is, if the recording position of the specific image extends across an area within the overlapping range R1 and areas on both sides of the overlapping range R1 (S104: NO), the controller 80 determines whether or not the recording command is a command to record a plurality of specific images (S106). If the recording command is not a command to record a plurality of specific images (i.e., the recording command is a command to record one specific image) (S106: NO), the controller 80 executes a first shifting process (S107) and proceeds to S111.

Figure 4A:
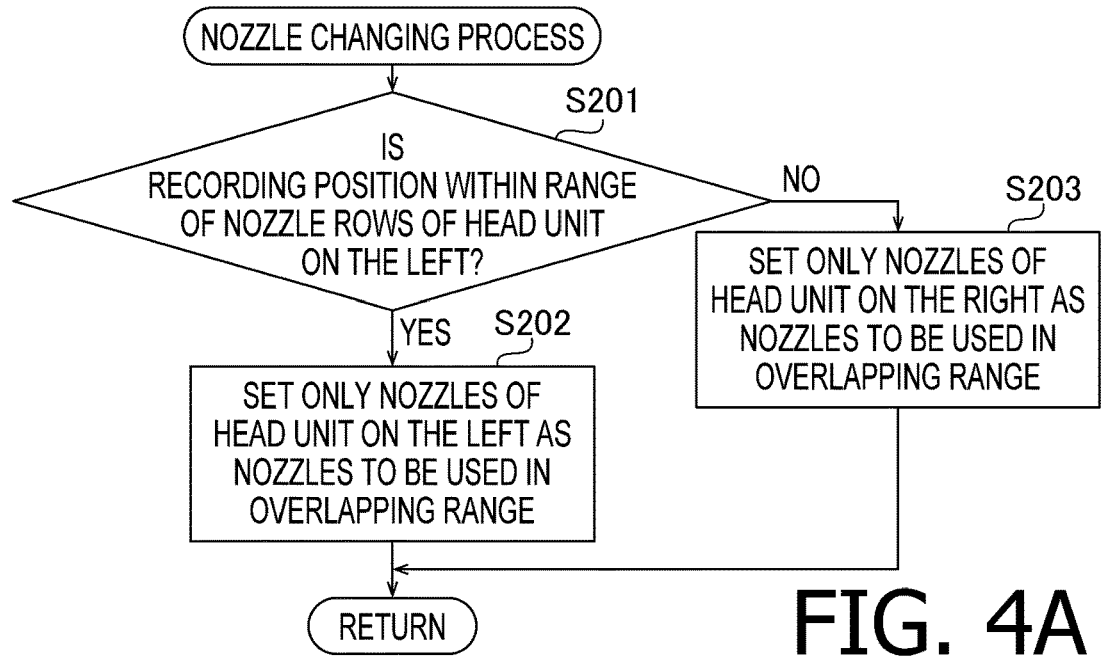
FIG. 4A is a flowchart illustrating processes in a nozzle changing process shown in FIG. 3.
Figure 4B:
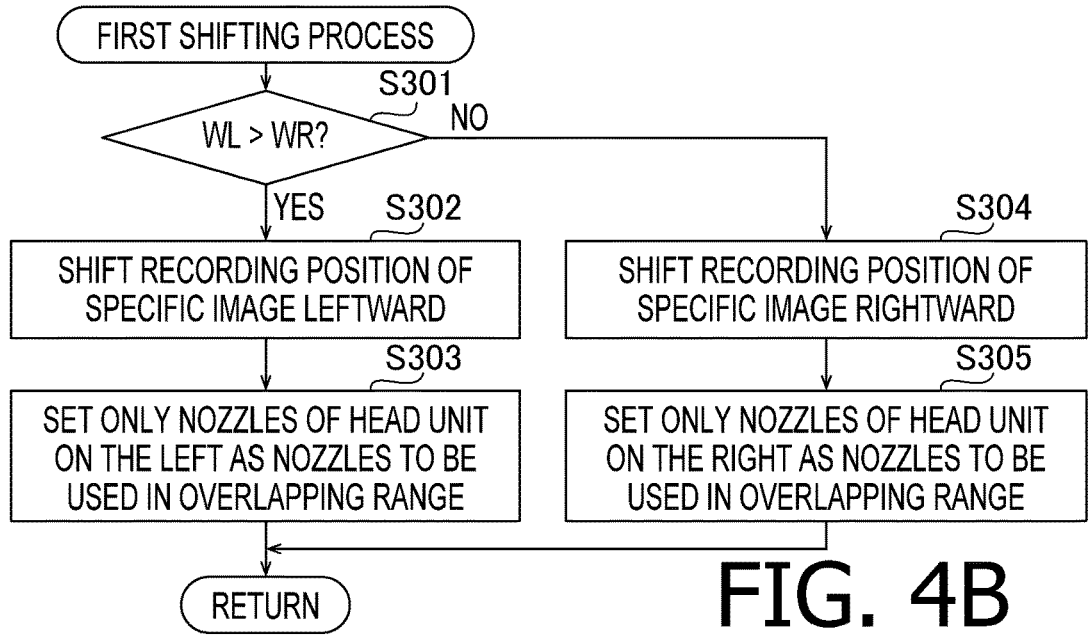
FIG. 4B is a flowchart illustrating processes in a first shifting process shown in FIG. 3.

In the first shifting process at S107, as shown in FIG. 4B, if a length WL of a portion of the specific image on the left side of the overlapping range R1 in the sheet-width direction is longer than a length WR of a portion of the specific image on the right side of the overlapping range R1 in the sheet-width direction (S301: YES), the controller 80 shifts the recording position of the specific image leftward such that the recording position of the specific image is within the range of the nozzle rows 9 of the head unit 6 on the left among the two head units 6 corresponding to the overlapping range R1 (S302). Furthermore, in the overlapping range R1, the controller 80 sets only the nozzles 10 of the head unit 6 on the left among the two head units 6 corresponding to the overlapping range R1 as the nozzles to be used for the recording of the specific image (S303).

On the other hand, if the length WL of the portion of the specific image on the left side of the overlapping range R1 in the sheet-width direction is equal to or less than the length WR of the portion of the specific image on the right side of the overlapping range R1 in the sheet-width direction (S301: YES), the controller 80 shifts the recording position of the specific image rightward such that the recording position of the specific image is within the range of the nozzle rows 9 of the head unit 6 on the right among the two head units 6 corresponding to the overlapping range R1 (S304). Furthermore, in the overlapping range R1, controller 80 sets only the nozzles 10 of the head unit 6 on the right among the two head units 6 corresponding to the overlapping range R1 as the nozzles to be used for the recording of the specific image (S305).

Figure 7A:
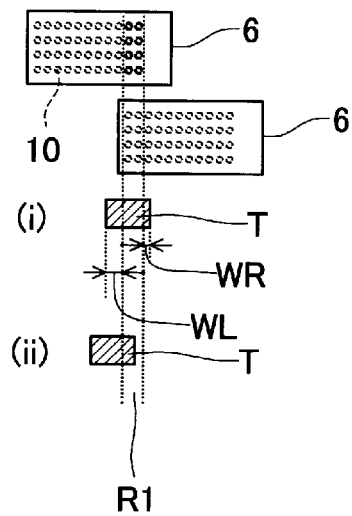
FIG. 7A illustrates a case where, in the first shifting process, a recording position of a specific image is shifted leftward.

When the first shifting process described above is executed, for example, in case the length WL of the specific image T is longer than the length WR of the specific image T such as a case shown in (i) of FIG. 7A (Hereinafter referred to as FIG. 7A(i). Similarly, (i), (ii), etc. in Fig. X (i.e., FIGS. 7 to 9) will be hereinafter referred to as Fig. X(i), Fig. X(ii), etc.) (S301: YES), the recording position of the specific image T is shifted leftward in the sheet-width direction and thus is arranged within the range of the nozzle rows 9 of the head unit 6 on the left among the two head units 6 corresponding to the overlapping range R1 as shown in FIG. 7A(ii) (S302). Furthermore, in the overlapping range R1, only the nozzles 10 of the head unit 6 on the left among the two head units 6 corresponding to the overlapping range R1 are set as the nozzles to be used for the recording of the specific image T (S303).

Figure 7B:
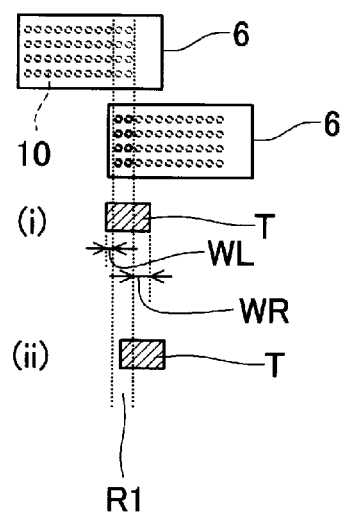
FIG. 7B illustrates a case where, in the first shifting process, the recording position of the specific image is shifted rightward.

On the other hand, for example, in case the length WL of the specific image T is equal to or less than the length WR of the specific image T such as a case shown in FIG. 7B(i) (S301: NO), the recording position of the specific image T is shifted rightward in the sheet-width direction and thus is arranged within the range of the nozzle rows 9 of the head unit 6 on the right among the two head units 6 corresponding to the overlapping range R1 as shown in FIG. 7B(ii) (S304). Furthermore, in the overlapping range R1, only the nozzles 10 of the head unit 6 on the right among the two head units 6 corresponding to the overlapping range R1 are set as the nozzles to be used for the recording of the specific image T (S305).

Referring back to FIG. 3, if the recording command is a command to record a plurality of specific images (S106: YES), the controller determines whether or not a second condition is satisfied (S108). The second condition is a condition in which the recording position of each of the plurality of specific images can be positioned within the range of the nozzle rows 9 of one head unit 6 in the sheet-width direction by integrally shifting the recording positions of all the plurality of specific images either leftward or rightward in the sheet-width direction. In S108, for example, the controller 80 performs the above-described determination based on the recording positions of the specific images indicated by image data input along with the recording command and the positions of the overlapping ranges R1 of respective head units 6 stored in the ROM 82 or the like in advance.

If the second condition is satisfied (S108: YES), the controller 80 executes a second shifting process (S109) and proceeds to S111. If the second condition is not satisfied (S108: NO), the controller 80 executes a third shifting process (S110) and proceeds to S111.

Figure 4C:
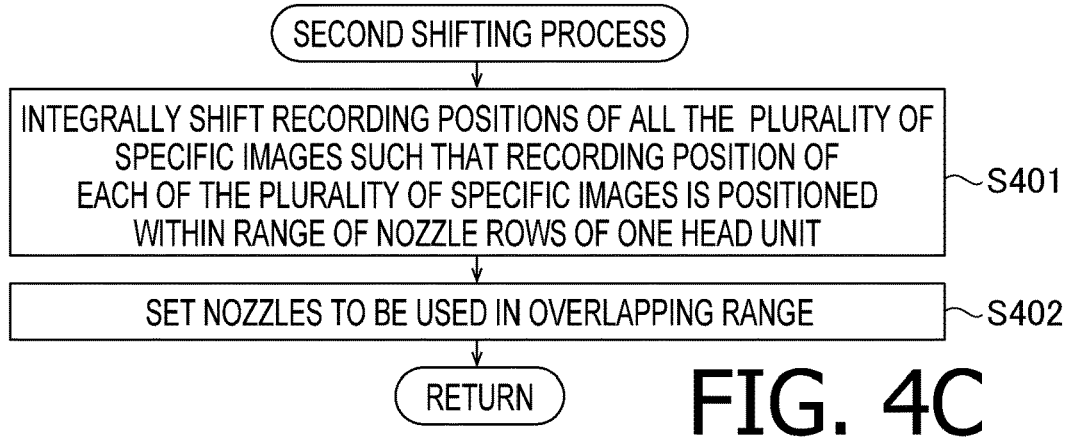
FIG. 4C is a flowchart illustrating processes in a second shifting process shown in FIG. 3.

In the second shifting process at S109, as shown in FIG. 4C, the controller 80 integrally shifts the recording positions of all the plurality of specific images either leftward or rightward in the sheet-width direction such that the recording position of each of the plurality of specific images is positioned within the range of the nozzle rows 9 of one head unit 6 in the sheet-width direction (S401). Whether to shift the recording positions of all the plurality of specific images leftward or rightward in the sheet-width direction is for example determined based on the recording positions of the specific images the image data indicates and the positions of the overlapping ranges R1 of respective head units 6 stored in the ROM 82 or the like in advance.

Then, the controller 80 sets the nozzles to be used in the overlapping range R1 for every specific image whose recording position in the sheet-width direction after the shifting includes the overlapping range R1 (S402).

For example, when recording the specific image whose recording position in the sheet-width direction after the shifting includes one of the overlapping ranges R1 and is within the range of the nozzle rows 9 of the head unit 6 on the left among the two head units 6 corresponding to the one of the overlapping ranges R1, in the one of the overlapping ranges R1, only the nozzles 10 of the head unit 6 on the left are set as the nozzles to be used.

On the other hand, when recording the specific image whose recording position in the sheet-width direction after the shifting includes one of the overlapping ranges R1 and is within the range of the nozzle rows 9 of the head unit 6 on the right among the two head units 6 corresponding to the one of the overlapping ranges R1, in the one of the overlapping ranges R1, only the nozzles 10 of the head unit 6 on the right are set as the nozzles to be used.

Figure 8A:
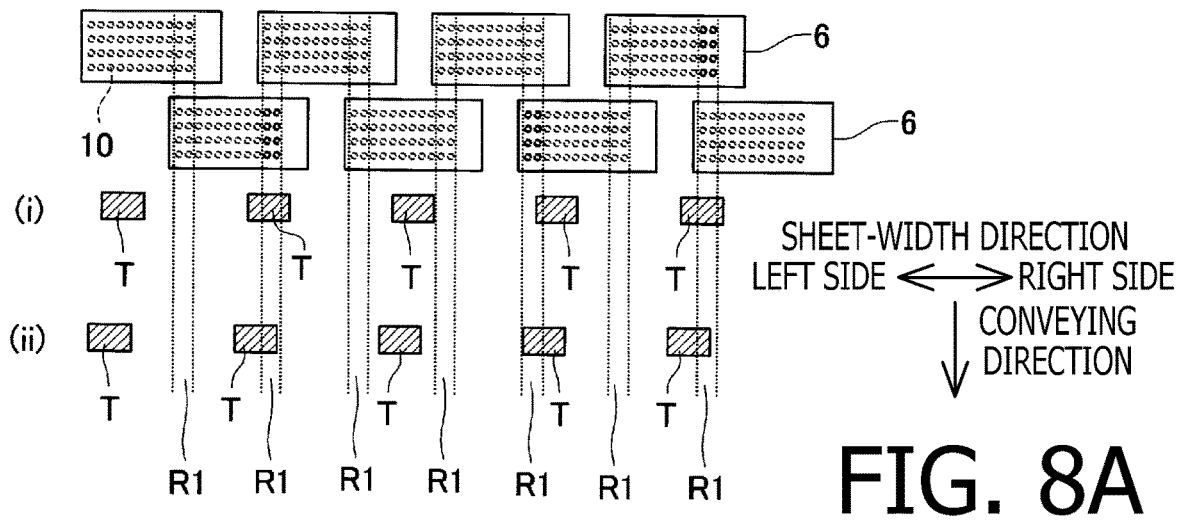
FIG. 8A illustrates a case where, in the second shifting process, recording positions of a plurality of specific images are integrally shifted leftward.
Figure 8B:
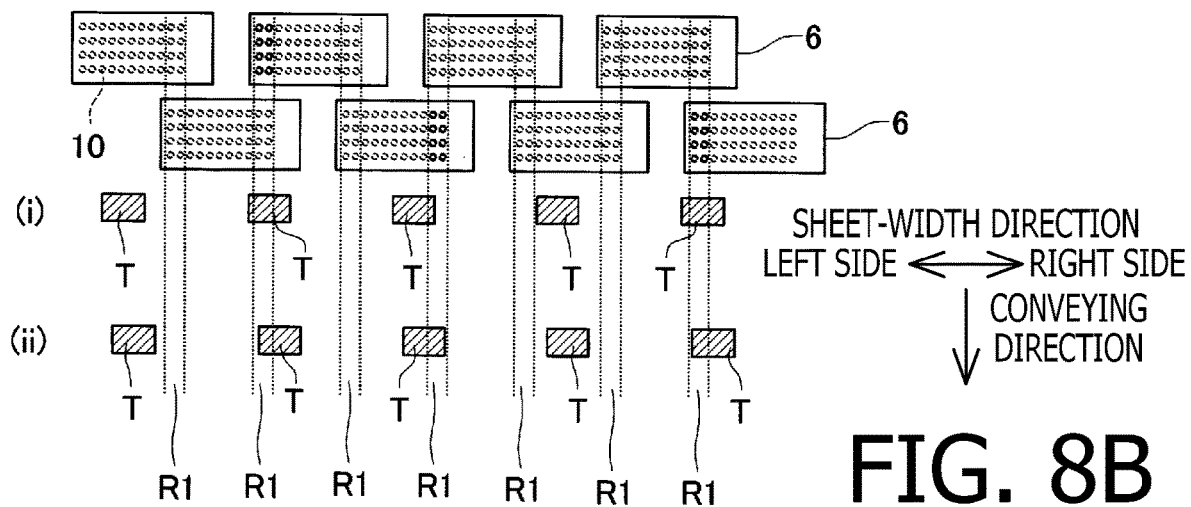
FIG. 8B illustrates a case where, in the second shifting process, the recording positions of the plurality of specific images are integrally shifted rightward.

When the second shifting process described above is executed, for example, in case a plurality of specific images T to be recorded does not satisfy the above-described first condition but satisfies the above-described second condition such as cases shown in FIG. 8A(i) and FIG. 8B(i), recording positions of the plurality of specific images T are integrally shifted either leftward or rightward in the sheet-width direction and the recording position of each of the plurality of specific images T is thereby positioned within the range of the nozzle rows 9 of one head unit 6 in the sheet-width direction as shown in FIG. 8A(ii) and FIG. 8B(ii) (S401). Then, the nozzles to be used in the overlapping range R1 are set for every specific image T whose recording position in the sheet-width direction after the shifting includes the overlapping range R1 in accordance (S402).

Figure 5A:
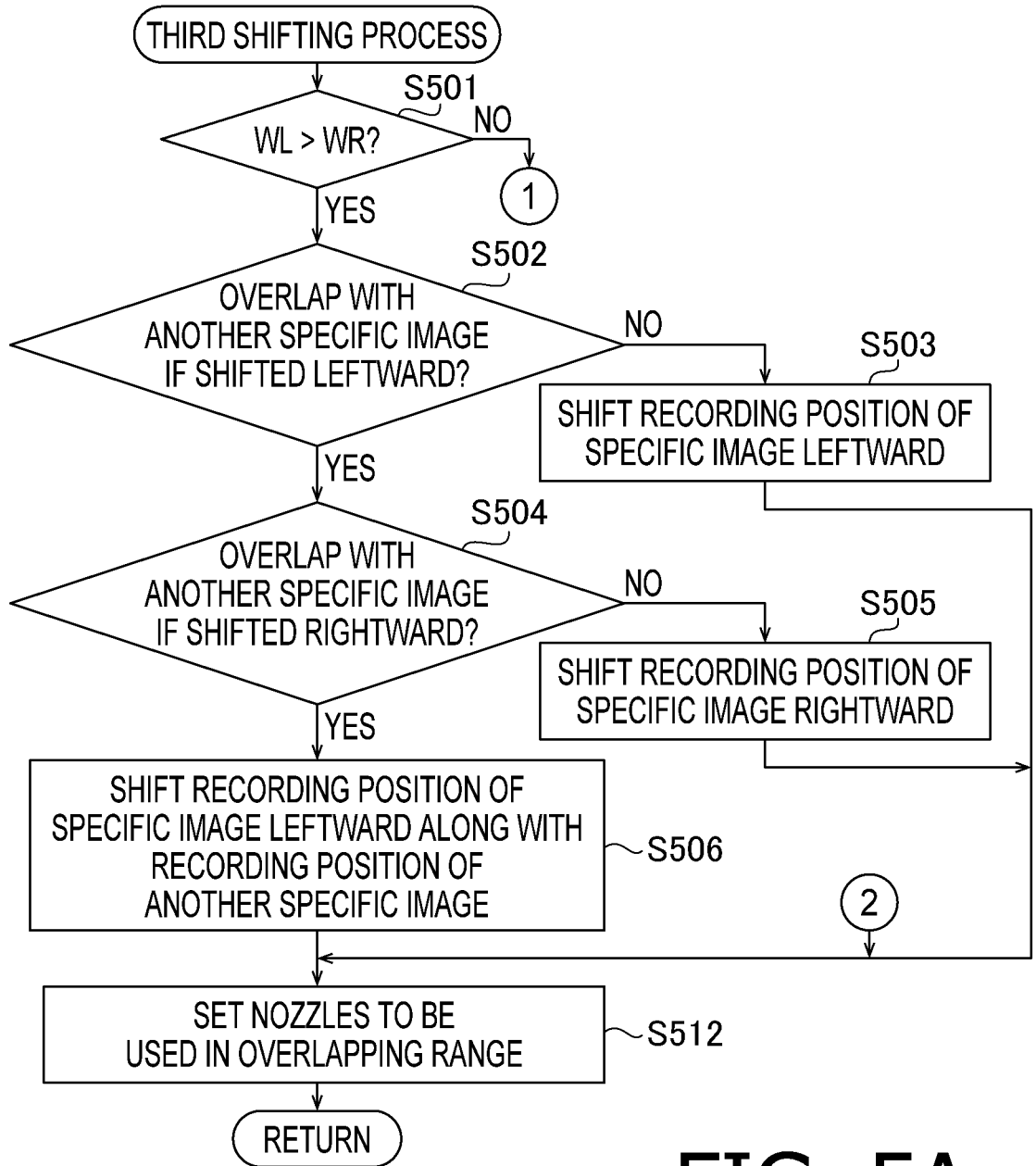
FIGS. 5A and 5B show a flowchart illustrating processes in a third shifting process shown in FIG. 3.
Figure 5B:
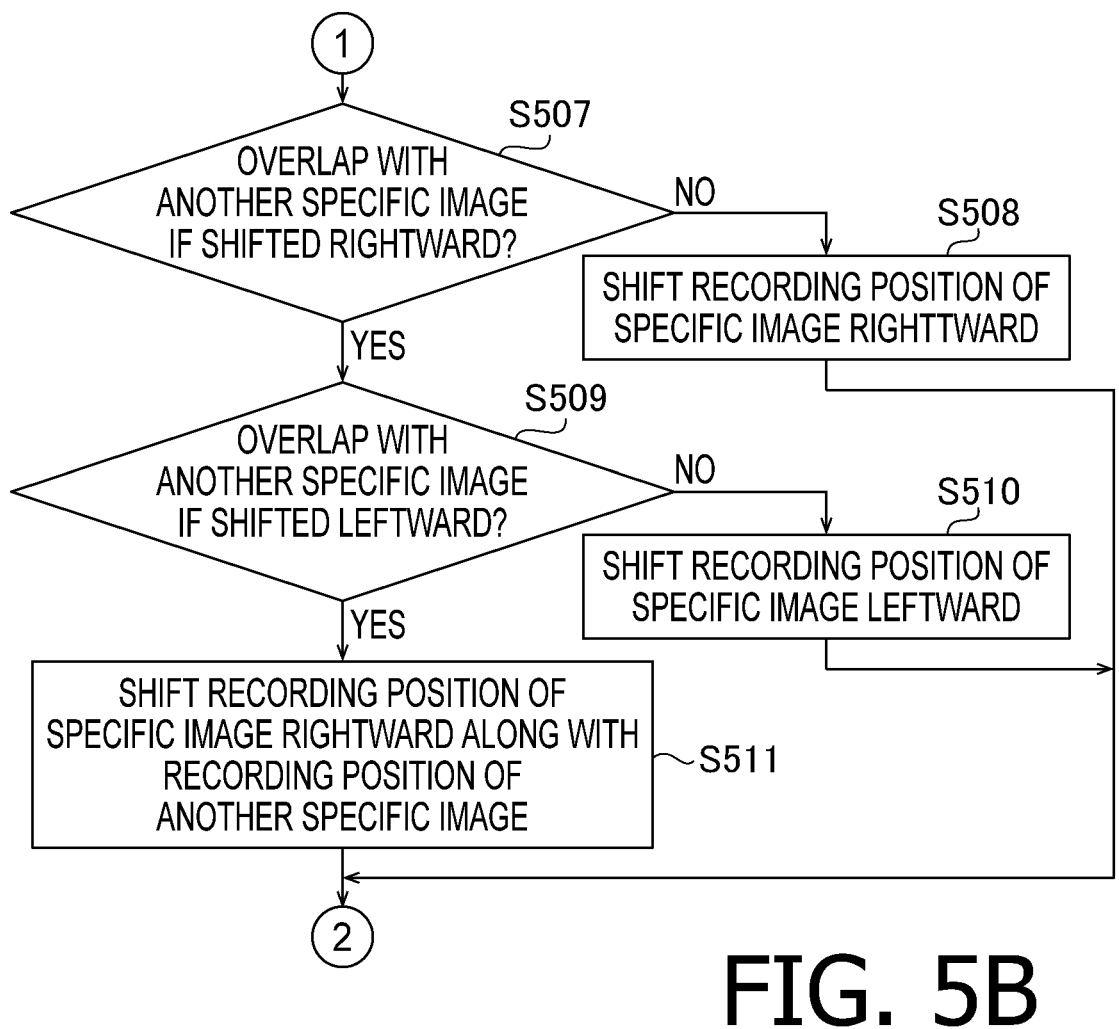

Referring back to FIG. 3, in the third shifting process at S110, the controller 80 executes processes in accordance with a flow shown in FIGS. 5A and 5B for every specific image having a portion that is within the overlapping range R1 in the sheet-width direction.

If the length WL of a portion of the specific image on the left side of the overlapping range R1 in the sheet-width direction is longer than the length WR of a portion of the specific image on the right side of the overlapping range R1 in the sheet-width direction (S501: YES), the controller 80 executes processes S502 to S506 described below.

In S502, the controller 80 determines whether or not the specific image overlaps with another specific image when the recording position of the specific image is shifted leftward such that the recording position of the specific image is within the range of the nozzle rows 9 of the head unit 6 on the left among the two head units 6 corresponding to the overlapping range R1.

If the specific image does not overlap with another specific image even when the recording position of the specific image is shifted leftward in the manner described above (S502: NO), the controller 80 shifts the recording position of the specific image leftward in the manner described above (S503) and proceeds to S512.

If the specific image overlaps with another specific image when the recording position of the specific image is shifted leftward in the manner described above (S502: YES), the controller 80 determines whether or not the specific image overlaps with another specific image when the recording position of the specific image is shifted rightward such that the recording position of the specific image is within the range of the nozzle rows 9 of the head unit 6 on the right among the two head units 6 corresponding to the overlapping range R1 (S504).

If the specific image does not overlap with another specific image even when the recording position of the specific image is shifted rightward in the manner described above (S504: NO), the controller 80 shifts the recording position of the specific image rightward in the manner described above (S505) and proceeds to S512.

If the specific image overlaps with another specific image when the recording position of the specific image is shifted rightward in the manner described above (S504: YES), the controller 80 shifts the recording position of the specific image leftward in the sheet-width direction along with a recording position of another specific image that overlaps with the specific image if the recording position of the specific image is shifted leftward in the manner described above such that the recording position of each of these specific images is within the range of the nozzle rows 9 of one head unit 6 in the sheet-width direction (S506). Shifting amounts of these specific images in this case may be the same or may be different. After S506, the controller 80 proceeds to S512.

In the third shifting process at S110, if the length WL of a portion of the specific image on the left side of the overlapping range R1 in the sheet-width direction is equal to or less than the length WR of a portion of the specific image on the right side of the overlapping range R1 in the sheet-width direction (S501: NO), the controller 80 executes processes S507 to S511 described below.

In S507, the controller 80 determines whether or not the specific image overlaps with another specific image when the recording position of the specific image is shifted rightward in the sheet-width direction such that the recording position of the specific image is within the range of the nozzle rows 9 of the head unit 6 on the right among the two head units 6 corresponding to the overlapping range R1.

If the specific image does not overlap with another specific image even if the recording position of the specific image is shifted rightward in the manner described above (S507: NO), the controller 80 shifts the recording position of the specific image rightward in the manner described above (S508) and proceeds to S512.

If the specific image overlaps with another specific image when the recording position of the specific image is shifted leftward in the manner described above (S507: YES), the controller 80 determines whether or not the specific image overlaps with another specific image when the recording position of the specific image is shifted leftward such that the recording position of the specific image is within the range of the nozzle rows 9 of the head unit 6 on the left among the two head units 6 corresponding to the overlapping range R1 (S509).

If the specific image does not overlap with another specific image even when the recording position of the specific image is shifted leftward in the manner described above (S509: NO), the controller 80 shifts the recording position of the specific image leftward in the manner described above (S510) and proceeds to S512.

If the specific image overlaps with another specific image when the recording position of the specific image is shifted leftward in the manner described above (S509: YES), the controller 80 shifts the recording position of the specific image rightward in the sheet-width direction along with a recording position of another specific image that overlaps with the specific image if the recording position of the specific image is shifted rightward in the manner described above such that the recording position of each of these specific images is within the range of the nozzle rows 9 of one head unit 6 in the sheet-width direction (S511). Shifting amounts of these specific images in this case may be the same or may be different. After S511, the controller 80 proceeds to S512.

In S512, as with S402, the controller 80 sets the nozzles to be used in the overlapping range R1 for every specific image whose recording position in the sheet-width direction after the shifting includes the overlapping range R1.

Figure 9A:
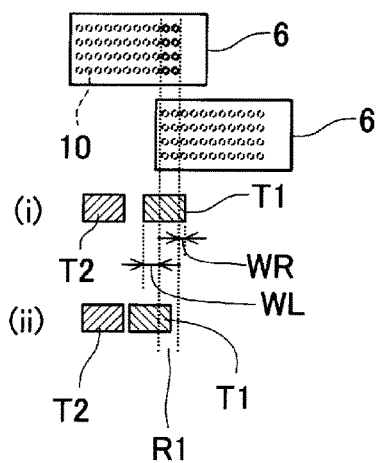
FIG. 9A illustrates a case where, in the third shifting process, a recording position of one of a plurality of specific images is independently shifted leftward.

When the third shifting process described above is executed in cases where the recording positions of the plurality of specific images are for example as shown in FIGS. 9A(i), 9B(i) and 9C(i), the length WL in the sheet-width direction of a specific image T1 which includes a portion that is within the overlapping range R1 is longer than the length WR in the sheet-width direction of the specific image T1 (S501: YES).

In case the recording positions of the plurality of specific images are as shown in FIG. 9A(i), as shown in FIG. 9A(ii), even when the recording position of the specific image T1 is shifted such that the recording position of the specific image T1 is within the range of the nozzle rows 9 of the head unit 6 on the left among the two head units 6 corresponding to the overlapping range R1, the specific image T1 does not overlap with a specific image T2 adjacently arranged on the left of the specific image T1 (S502: NO). Therefore, in this case, the recording position of the specific image T1 is shifted leftward to a position shown in FIG. 9A(ii) (S503).

Figure 9B:
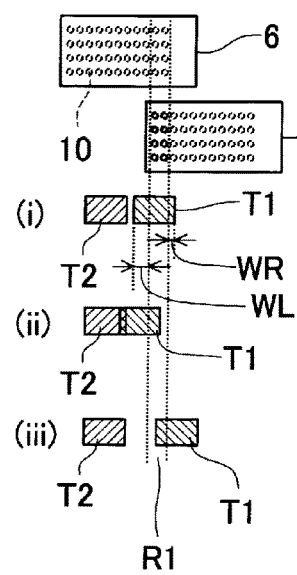
FIG. 9B illustrates a case where, in the third shifting process, a recording position of one of a plurality of specific images is independently shifted rightward.

In case the recording positions of the plurality of specific images are as shown in FIG. 9B(i), as shown in FIG. 9B(ii), when the recording position of the specific image T1 is shifted such that the recording position of the specific image T1 is within the range of the nozzle rows 9 of the head unit 6 on the left among the two head units 6 corresponding to the overlapping range R1, the specific image T1 overlaps with the specific image T2 adjacently arranged on the left of the specific image T1 (S502: YES). On the other hand, as shown in FIG. 9B(iii), even when the recording position of the specific image T1 is shifted such that the recording position of the specific image T1 is within the range of the nozzle rows 9 of the head unit 6 on the right among the two head units 6 corresponding to the overlapping range R1, the specific image T1 does not overlap with another specific image (S504: NO). Therefore, in this case, the recording position of the specific image T1 is shifted rightward to a position shown in FIG. 9B(iii) (S505).

Figure 9C:
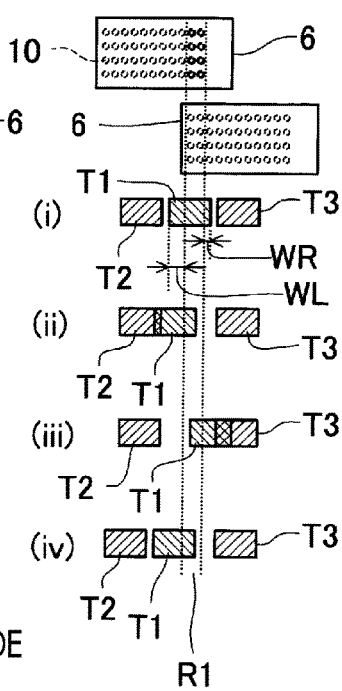
FIG. 9C illustrates a case where, in the third shifting process, a recording position of one of a plurality of specific images is shifted leftward along with the other specific images.

In case the recording positions of the plurality of specific images are as shown in FIG. 9C(i), as shown in FIG. 9C(ii), when the recording position of the specific image T1 is shifted such that the recording position of the specific image T1 is within the range of the nozzle rows 9 of the head unit 6 on the left among the two head units 6 corresponding to the overlapping range R1, the specific image T1 overlaps with the specific image T2 adjacently arranged on the left of the specific image T1 (S502: YES). Furthermore, as shown in FIG. 9C(iii), when the recording position of the specific image T1 is shifted such that the recording position of the specific image T1 is within the range of the nozzle rows 9 of the head unit 6 on the right among the two head units 6 corresponding to the overlapping range R1, the specific image T1 overlaps with a specific image T3 adjacently arranged on the right of the specific image T1 (S504: YES). Therefore, in this case, shown in FIG. 9C(iv), the recording position of the specific image T1 is shifted leftward along with the specific image T2 (S506).

Referring back to FIG. 3, in S111, the controller 80 executes a recording process. In the recording process of S111, the controller 80 records an image on the recording sheet P by controlling the conveying motor 86 to cause the conveying rollers 4 and 5 to convey the recording sheet P in the conveying direction and, at the same time, driving the eight head units 6 to eject ink from the plurality of nozzles 10.

In case the nozzles to be used in the overlapping ranges R1 are changed by the processes S101 to S110, the controller 80 causes the nozzles to be used in the overlapping ranges R1 after the change to eject ink. In case the recording positions of the specific images are shifted by the processes S101 to S110, the controller 80 causes the nozzles 10 to eject ink to record the specific images at the shifted positions. Then, the recording process of S111 is executed to record the specific image on the recording sheet P.

Effects of First Embodiment

In the first embodiment, when recording a barcode or two-dimensional code as the specific image, if the specific image includes a portion that is within the overlapping range R1 in the sheet-width direction, the specific image is recorded by using only ink ejected from the plurality of nozzles 10 of one head unit 6 by changing the setting of the nozzles to be used in the overlapping range R1 and/or by shifting the recording position of the specific image in the sheet-width direction. By this configuration, it becomes possible to suppress degradation of image quality of the recorded specific image even when a conveying speed of the recording sheet P by the conveying rollers 4 and 5 slightly changes while recording the specific image.

In the first embodiment, if the first condition is satisfied (S104: YES), the nozzles to be used in the overlapping range R1 are changed by the nozzle changing process and the specific image is recorded by causing only the nozzles 10 of one of the two head units 6 corresponding to the overlapping range R1 to eject ink (S105). With this configuration, there is no need to shift the recording position of the specific image in the sheet-width direction.

In the first embodiment, when recording a plurality of specific images, if the first condition is not satisfied but the second condition is satisfied (S104: NO, S106: YES, S108: YES), the plurality of specific images is integrally shifted in the sheet-width direction by the second shifting process such that the recording position of each of the plurality of specific images is positioned within the range of the nozzle rows 9 of one head unit 6 in the sheet-width direction (S109). In this case, the recording positions of the plurality of specific images are shifted in the sheet-width direction but positional relationships between the plurality of specific images are maintained.

In the first embodiment, when recording a plurality of specific images, if both the first condition and the second condition are not satisfied (S104: NO, S106: NO, S108: NO), a recording position of every specific image including a portion that is within the overlapping range R1 in the sheet-width direction is shifted in the sheet-width direction by the third shifting process such that the recording position of each of the plurality of specific images is positioned within the range of the nozzle rows 9 of one head unit 6 in the sheet-width direction (S110). By this configuration, the positional relationships between the plurality of specific images change but each of the plurality of specific images can be recorded only with ink ejected by a plurality of nozzles 10 of one head unit 6.

In the first embodiment, in the first and third shifting process, the recording position of the specific image is shifted leftward when the length WL is longer than the length WR (S302, S503), and the recording position of the specific image is shifted rightward when the length WL is equal to or less than the length WR (S304, S508). By this configuration, it becomes possible to minimize a shifting amount of the specific image. Furthermore, in case of the third shifting process, changes in the positional relationships between the plurality of specific images due to the shifting of the recording positions of the specific images can be minimized.

In the first embodiment, in the third shifting process, in case the specific image overlaps with another specific image if the recording position of the specific image is shifted in a direction determined based on the magnitude relationship between the length WL and the length WR of the specific image as described above (S502: YES, S507: YES), the recording position of the specific image is shifted in a direction opposite to the determined direction described above (S505, S510). With this configuration, changes in the positional relationships between the plurality of specific images due to the shifting of the recording positions of the specific images get greater but it becomes possible to make the specific images not to overlap with each other.

In the first embodiment, in the third shifting process, in case the specific image overlaps with an other specific image if the recording position of the specific image is shifted in either side in the sheet-width direction (S502: YES and S504: YES, S507: YES and S509: YES), the recording position of the specific image and a recording position of the other specific image are shifted in a direction determined based on the magnitude relationship between the length WL and the length WR of the specific image as described above (S506, S511). By this configuration, it becomes possible to make the specific images not to overlap with each other.

In case the specific image is a barcode or two-dimensional code, if the length of the smallest element of the barcode or two-dimensional code in the conveying direction is long, even if the conveying speed of the recording sheet P by the conveying rollers 4 and 5 slightly changes and a slight misalignment in the conveying direction between portions recorded by the two head units 6 occurs, the barcode or two-dimensional code can be read. Therefore, in the first embodiment, the specific image including a portion that is within the overlapping range R1 in the conveying direction is recorded using only one of the two head units 6 corresponding to the overlapping range R1 only when the length of the smallest element of the barcode or two-dimensional code in the conveying direction is equal to or less than 254 µm (S102: YES).

Second Embodiment

Next, a second embodiment of the present disclosures will be described.

Figure 10:
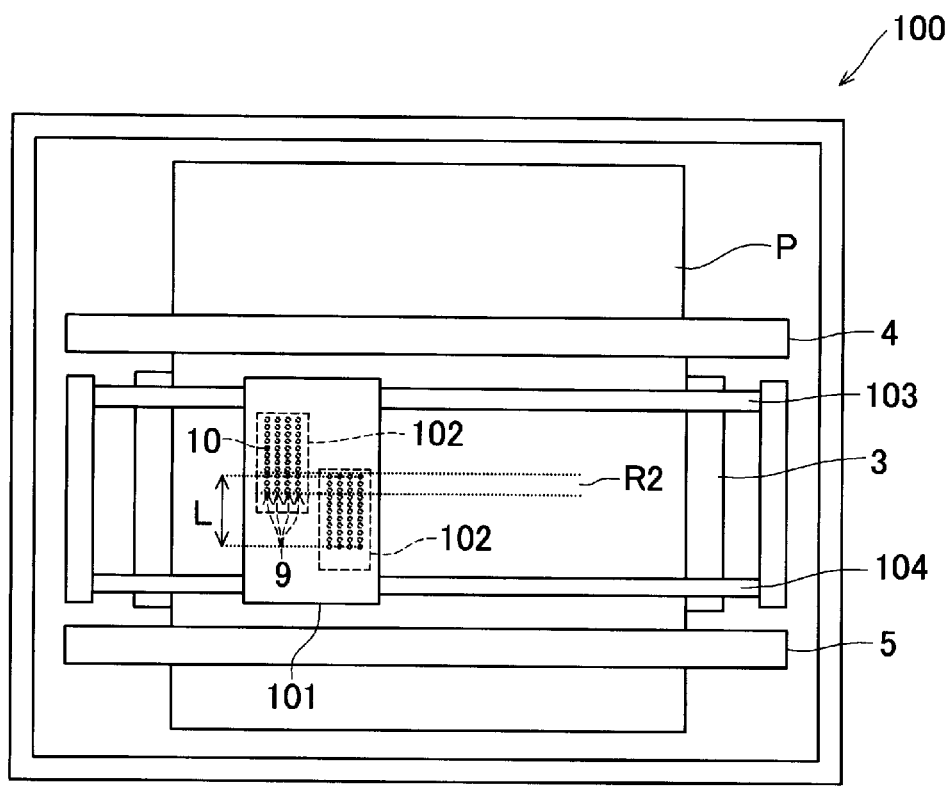
FIG. 10 is a schematic diagram of a printer according to a second embodiment of the present disclosure.

As shown in FIG. 10, a printer 100 according to the second embodiment includes a carriage 101, two head units 102, and the platen 3 and conveying rollers 4 and 5 similar to those of the printer 1 according to the first embodiment. It is noted that the carriage 101 is an example of the relative displacement unit according to aspects of the present disclosures, and a combination of the two head units 102 is an example of the liquid ejection head according to aspects of the present disclosures.

The carriage 101 is positioned above the platen 3 between the conveying roller 4 and the conveying roller 5 in the conveying direction. The carriage 101 is supported by two guide rails 103 and 104 extending in the sheet-width direction. The carriage 101 is connected to a carriage motor 106 (See FIG. 11.) via a conventionally known belt and the like. As the carriage motor 106 is driven, the carriage 101 moves along the guide rails 103 and 104 in the sheet-width direction. It is noted that the sheet-width direction in the second embodiment is an example of the relative displacement direction according to aspects of the present disclosures.

The two head units 102 are similar to the head units 6 of the printer 1 according to the first embodiment and are mounted on the carriage 101. However, in the head unit 102, the plurality of nozzles 10 forming the nozzle rows 9 are arranged such that the arrangement direction becomes parallel to the conveying direction. It is noted that the conveying direction in the second embodiment is an example of the nozzle arrangement direction according to aspects of the present disclosures. The two head units 102 are shifted with respect to each other in the sheet-width direction and the conveying direction. In an overlapping range R2 in the conveying direction, a portion of the nozzles 10 of the head unit 102 on the upstream side in the conveying direction and a portion of the nozzles 10 of the head unit 102 on the downstream side in the conveying direction overlap in the sheet-width direction.

The printer 100 records an image on the recording sheet P by repeatedly executing a recording pass in which ink is ejected from the plurality of nozzles 10 of the two head units 102 while moving the carriage 101 in the sheet-width direction and a conveying operation in which the recording sheet P is conveyed by the conveying rollers 4 and 5 for a particular distance.

Figure 11:
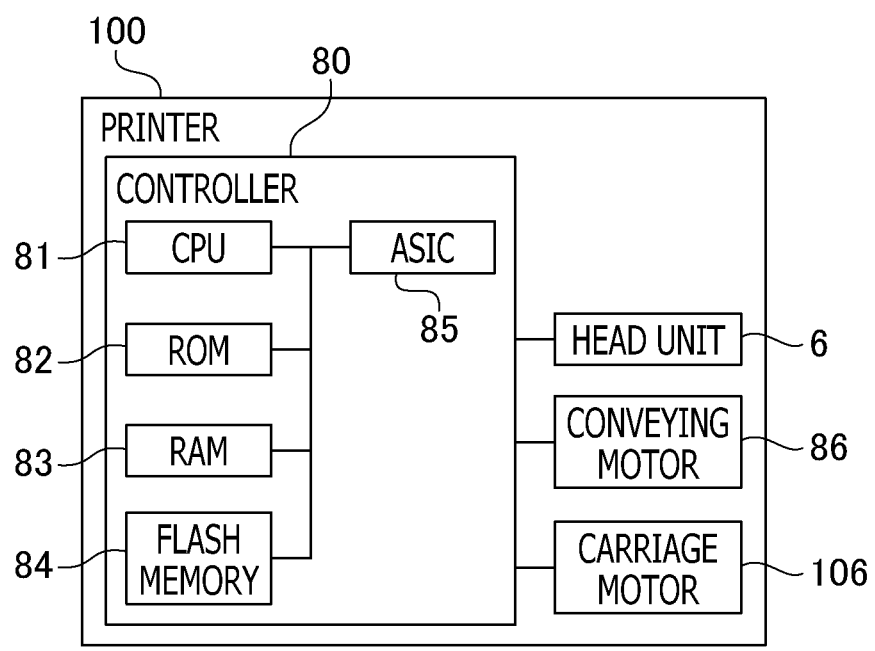
FIG. 11 is a block diagram showing an electrical configuration of the printer according to the second embodiment of the present disclosure.

As shown in FIG. 11, the printer 100 includes the controller 80 and the conveying motor 86 similar to those of the printer 1 according to the first embodiment, and the controller 80 controls the head units 102, the conveying motor 86, the carriage motor 106 and the like.

Control for Recording

Next, a flow of processes for recording an image with the printer 100 will be described. When a recording command instructing to execute recording of an image is input, the controller 80 executes processes in accordance with a flow shown in FIGS. 12A and 12B.

Figure 12A:
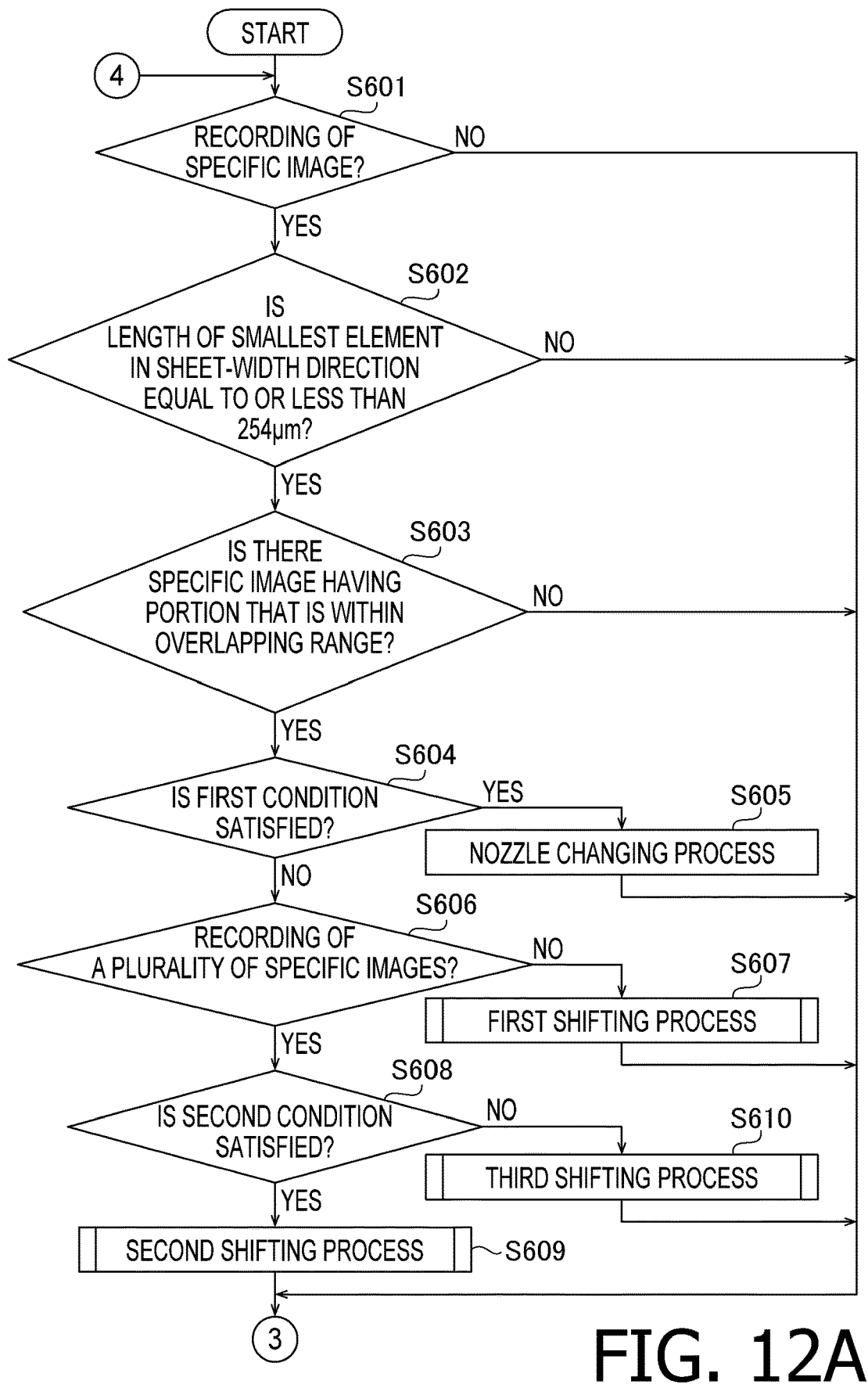
FIGS. 12A and 12B show a flowchart illustrating processes to be executed by the printer according to the second embodiment of the present disclosure when executing recording.
Figure 12B:
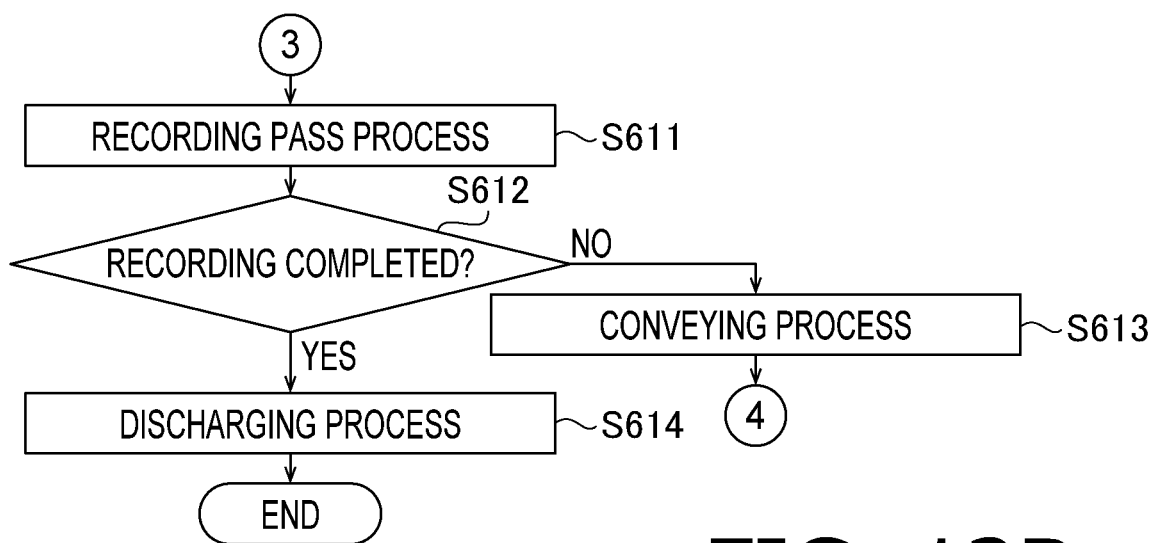

Processes of S601 to S610 in the flow shown in FIG. 12A are similar to the processes of S101 to S110 of the first embodiment. However, in S602, the controller 80 determines whether or not a length in the sheet-width direction of the smallest element of the specific image is equal to or less than a particular length which is, in the present embodiment, 254 µm. Furthermore, in S603, the controller 80 determines whether or not there is a specific image that is to be recorded by a recording pass of S601 which will be described later and having a portion that is within the overlapping range R2 in the conveying direction.

The first condition in S604 is a condition in which the specific image is entirely within a range of the nozzle rows 9 of one of the head units 102 in the conveying direction of one of the two head units 6 corresponding to the one of the overlapping ranges R1. If the recording command is a command to record one specific image in the recording pass of S601 which will be described later, the first condition is a condition in which the one specific image is entirely within a range of the nozzle rows 9 of one of the head units 102 in the conveying direction. If the recording command is a command to record a plurality of specific images in the recording pass of S601 which will be described later, the first condition is a condition in which every specific image is entirely within the range of the nozzle rows 9 of one of the head units 102 in the conveying direction.

The second condition in S608 is a condition in which the recording position of each of the plurality of specific images can be positioned within the range of the nozzle rows 9 of one head unit 102 in the conveying direction by integrally shifting the recording positions of all the plurality of specific images either toward the upstream side or toward the downstream side in the conveying direction.

The nozzle changing process of S605 is similar to the nozzle changing process of the first embodiment (See FIG. 4A). The first shifting process of S607 is similar to the first shifting process of the first embodiment (See FIG. 4B). The second shifting process of S609 is similar to the second shifting process of the first embodiment (See FIG. 4C). The third shifting process of S610 is similar to the third shifting process of the first embodiment (See FIGS. 5A and 5B).

However, in the second embodiment, the processes are executed while replacing the "sheet-width direction," the "leftward in the sheet-width direction" and the "rightward in the sheet-width direction" in the flows of FIGS. 4A to 4C and FIGS. 5A and 5B with the "conveying direction," the "upstream side in the conveying direction" and the "downstream side in the conveying direction."

After the processes of S601 to S610, the controller 80 executes the recording pass process (S611). In the recording pass process of S611, the controller 80 controls the carriage motor 106 to move the carriage 101 in the sheet-width direction and, at the same time, controls the head unit 102 to eject ink from the plurality of nozzles 10 to thereby execute a recording pass. In case the nozzles to be used in the overlapping range R2 are changed by the processes S601 to S610, the controller 80 causes the nozzles to be used in the overlapping range R2 after the change to eject ink. In case the recording position of the specific image is shifted by the processes S601 to S610, the controller 80 causes the nozzles 10 to eject ink to record the specific image at the shifted position. Then, the recording process of S111 is executed to record the specific image on the recording sheet P.

Then, if recording of an image on the recording sheet P is not yet completed (S612: NO), the controller 80 executes a conveying process (S613) and then returns to S601. In the conveying process of S613, the controller 80 controls the conveying motor 86 to cause the conveying roller 4 and 5 to perform a conveying operation in which the conveying roller 4 and 5 convey the recording sheet P for a particular distance. By this configuration, the recording pass and the conveying operation are repeated until the recording of the image on the recording sheet P is completed.

When the recording of the image on the recording sheet P is completed (S612: YES), the controller 80 executes a sheet discharge process (S614) and terminates the process. In the sheet discharge process of S614, the controller 80 controls the conveying motor 86 to cause the conveying rollers 4 and 5 to discharge the recording sheet P.

Effects of Second Embodiment

In the second embodiment, when recording a barcode or two-dimensional code as the specific image, if the specific image includes a portion that is within the overlapping range R2 in the conveying direction, the specific image is recorded by using only ink ejected from the plurality of nozzles 10 of one head unit 102 by changing the setting of the nozzles to be used in the overlapping range R2 and/or by shifting the recording position of the specific image. By this configuration, it becomes possible to suppress degradation of image quality of the recorded specific image even when a moving speed of the carriage 101 slightly changes during the recording pass.

Variations

The first and second embodiments of the present disclosures have been described. However, the present disclosures are not limited to the first and second embodiments but various modification are possible within the scope of the technical ideas described herein.

In the first and second embodiments, when the length in the relative displacement direction (i.e., the conveying direction of the first embodiment and the sheet-width direction of the second embodiment) of the smallest element of a specific image (i.e., a barcode or two-dimensional code) is equal to or less than 254 µm, as described above, the processes for recording the specific image having a portion that is within the overlapping range R1 or R2 with only one head unit 6 or 102 are executed. However, in the first embodiment, the above described processes may, for example, be executed when the length in the relative displacement direction of the smallest element of a specific image is equal to or less than a particular length other than 254 µm or the above described processes may be executed regardless of the length in the relative displacement direction of the smallest element of the specific image.

In the first and second embodiments, in the third shifting process, if a specific image having a portion that is within the overlapping range R1 or R2 in the relative displacement direction does not overlap with another specific image when a recording position of the specific image is shifted toward a side in which a length of a portion protruding out of the overlapping range R1 or R2 is longer, the controller 80 shifts the recording position of the specific image toward the side in which the length of the portion protruding out of the overlapping range R1 or R2 is longer. On the other hand, if the specific image having the portion that is within the overlapping range R1 or R2 in the relative displacement direction overlaps with another specific image when the recording position of the specific image is shifted toward a side in which a length of a portion protruding out of the overlapping range R1 or R2 is longer but does not overlap with another specific image when the recording position of the specific image is shifted toward the opposite side, the controller 80 shifts the recording position of the specific image toward the opposite side. If the specific image overlaps with another specific image when the recording position of the specific image is shifted toward either side in the nozzle arrangement direction, the controller 80 shifts the recording position of the specific image and a recording position of another specific image toward the side in which the length of the portion protruding out of the overlapping range R1 or R2 is longer so that the specific images do not overlap with each other.

However, in the third shifting process, if the specific image overlaps with another specific image when the recording position of the specific image is shifted toward either side in the nozzle arrangement direction, the recording position of the specific image and the recording position of another specific image may, for example, be shifted toward a side in which the length of the portion protruding out of the overlapping range R1 or R2 is shorter so that the specific images do not overlap with each other.

Alternatively, in the third shifting process, the controller 80 may, for example, shift only a recording position of a specific image that has a portion that is within the overlapping range R1 or R2 and that can be shifted toward one of the sides in the nozzle arrangement direction to be positioned within the range of the nozzle rows 9 of one head unit 6 or 102 without overlapping with another specific image. In this case, at least one of the plurality of specific images can be recorded using only one head unit 6 or 102.

Alternatively, in the third shifting process, if the specific image having a portion that is within the overlapping range R1 or R2 in the relative displacement direction overlaps with an other specific image when the recording position of the specific image is shifted toward the side in which the length of the portion protruding out of the overlapping range R1 or R2 in the nozzle arrangement direction is longer, the controller 80 may, for example, always shift the recording position of the specific image toward the side in which the length of the portion protruding out of the overlapping range R1 or R2 in the nozzle arrangement direction is longer along with the recording position of the other specific image.

Alternatively, in the third shifting process, the controller 80 may, for example, shift only the recording position of the specific image that has a portion that is within the overlapping range R1 or R2 in the nozzle arrangement direction and that can be shifted toward the side in which the length of the portion protruding out of the overlapping range R1 or R2 is longer without overlapping with another specific image toward the side in which the length of the portion protruding out of the overlapping range R1 or R2 is longer. In this case, at least one of the plurality of specific images can be recorded using only one head unit 6 or 102.

Also, in the third shifting process, the recording position of the specific image that has a portion that is within the overlapping ranges R1 and R2 in the relative displacement direction may, for example, be shifted toward the side in which the length of the portion protruding out of the overlapping range R1 or R2 is shorter regardless of whether the specific image overlaps with another specific image or not when the recording position of the specific image is shifted toward the side in which the length of the portion protruding out of the overlapping range R1 or R2 is longer.

Alternatively, in the third shifting process, a side in the nozzle arrangement direction toward which the recording position of the specific image that has a portion that is within the overlapping range R1 or R2 is to be shifted may, for example, be determined based on factors other than the lengths in the relative displacement direction of the portion protruding out of the overlapping range R1 or R2.

In the first and second embodiments, in the first to third shifting processes, the recording position of the specific image is shifted in the nozzle arrangement direction and, for the specific image whose recording position after the shifting includes a portion that is within the overlapping range R1 or R2 in the relative displacement direction, the setting of the nozzles to be used in the overlapping range R1 or R2 is changed. However, for example, in the first to third shifting processes, if possible, the recording position of the specific image may be shifted such that the recording position of the specific image after the shifting does not include a portion that is within the overlapping range R1 or R2 in the relative displacement direction, and the process for changing the setting of the nozzles to be used in the overlapping range R1 or R2 may be eliminated.

In the first and second embodiments, when recording a plurality of specific images arranged in the nozzle arrangement direction, the nozzle changing process is executed when the first condition is satisfied, the second shifting process is executed when the first condition is not satisfied but the second condition is satisfied, and the third shifting process is executed when both the first and second conditions are not satisfied.

However, when recording a plurality of specific images arranged in the nozzle arrangement direction, recording positions of the plurality of specific images may, for example, be shifted integrally in the nozzle arrangement direction even when both the first and second conditions are not satisfied. In this case, the recording positions of the plurality of specific images may, for example, be shifted integrally to maximize a number of specific images that can be recorded using only one head unit 6 or 102. With this configuration, even when both the first and second conditions are not satisfied, at least one of the plurality of specific images can be recorded using only one head unit 6 or 102.

When recording a plurality of specific images arranged in the nozzle arrangement direction, for example, the nozzle changing process may be executed when the first condition is satisfied, and, when the first condition is not satisfied, the third shifting process may be executed regardless of whether the second condition is satisfied or not.

When the first condition is satisfied, if possible, the recording position of the specific image may be shifted such that the recording position of the specific image after the shifting does not include a portion that is within the overlapping range R1 or R2 in the relative displacement direction and the process for changing the setting of the nozzles to be used in the overlapping range R1 or R2 may be eliminated.

A printer may be configured to be capable of executing only some of the nozzle changing process and the first to third shifting processes described above. Even in this case, when a specific image satisfies one or more conditions for executing one or more processes the printer can execute, it is possible to record the specific image using only one head unit. Alternatively, a specific image having a portion that is within the overlapping range R1 or R2 in the relative displacement direction may be recorded using only one head unit 6 or 102 by executing one or more processes other than the nozzle changing process and the first to third shifting processes. For example, a position of the overlapping range R1 or R2 in the nozzle arrangement direction may be shifted by shifting a position of the head unit 6 or 102 in the nozzle arrangement direction.

Aspects of the present disclosures has been described by taking a case where the specific image is a barcode or two-dimensional code as an example. However, the specific image may be an image other than a barcode or two-dimensional code. For example, aspect of the present disclosures can be applied to a recording device configured to record other specific images such as a plurality of labels on one recording medium.

Aspects of the present disclosures has been described by taking a printer configured to perform recording on a recording medium by ejecting ink from nozzles as an example. However, aspects pf the present disclosures can be applied to recording devices configured to perform recording by ejecting liquid other than ink.

What is claimed is:
1. A recording apparatus comprising:
   a liquid ejection head having a nozzle surface to which a plurality of nozzles are formed;
   a relative displacement unit configured to cause the liquid ejection head and a recording medium to relatively displace in a relative displacement direction parallel to the nozzle surface; and
   a controller,
   wherein:
     the liquid ejection head has two head units each having the nozzle surface to which the plurality of nozzles arranged in a nozzle arrangement direction intersecting with the relative displacement direction are formed,
     the two head units are arranged while shifting their positions with respect to each other in the relative displacement direction and the nozzle arrangement direction, and
     some of the nozzles of the two head units overlap with each other in the relative displacement direction within a particular overlapping range in the nozzle arrangement direction,
   wherein when a recording command instructing to record an image on a recording medium is input, the controller controls the relative displacement unit to cause the liquid ejection head and the recording medium to relatively displace in the relative displacement direction and, at the same time, controls the two head units to eject liquid from the plurality of nozzles to record an image on the recording medium, and
   wherein when the recording command is an instruction to record, in an area of the recording medium including an area within the overlapping range in the nozzle arrangement direction, a specific image whose length in the nozzle arrangement direction is equal to or less than an arrangement range of the plurality of nozzles of the head unit, the controller controls the two head units to cause only one of the two head units to record the specific image.
2. The recording apparatus according to claim 1,
   wherein when the recording command is an instruction to record the specific image in an area of the recording medium including an area within the overlapping range in the nozzle arrangement direction, when a recording position of the specific image is within the arrangement range of the plurality of nozzles of one of the two head units in the nozzle arrangement direction, the controller controls the two head units to cause only the plurality of nozzles of the one of the two head units to eject liquid to record the specific image.

3. The recording apparatus according to claim 1, wherein when the recording command is an instruction to record a plurality of specific images and to record at least one of the plurality of specific images in an area on a recording medium extending across an area within the overlapping range and areas adjacent to both sides of the overlapping range in the nozzle arrangement direction, the controller shifts recording positions of all the plurality of specific images integrally in the nozzle arrangement direction such that the recording position of each of the plurality of specific images is within the arrangement range of the plurality of nozzles of one of the two head units in the nozzle arrangement direction and controls the two head units to record the plurality of specific images.

4. The recording apparatus according to claim 1, wherein when the recording command is an instruction to record a plurality of specific images and to record at least one of the plurality of specific images in an area on a recording medium extending across an area within the overlapping range and areas adjacent to both sides of the overlapping range in the nozzle arrangement direction, the controller shifts a recording position of at least one of the plurality of specific images in the nozzle arrangement direction such that the recording position of the at least one of the plurality of specific images is within the arrangement range of the plurality of nozzles of one of the two head units in the nozzle arrangement direction and controls the two head units to record the plurality of specific images.

5. The recording apparatus according to claim 4, wherein:
when a length in the nozzle arrangement direction of a portion of the at least one of the plurality of specific images protruding out of the overlapping range toward one side in the nozzle arrangement direction is longer than a length in the nozzle arrangement direction of a portion of the at least one of the plurality of specific images protruding out of the overlapping range toward the other side in the nozzle arrangement direction, the controller shifts the recording position of the at least one of the plurality of specific images toward the one side in the nozzle arrangement direction such that the recording position of the at least one of the plurality of specific images is within the arrangement range of the plurality of nozzles of one of the two head units, and
when the length in the nozzle arrangement direction of the portion of the at least one of the plurality of specific images protruding out of the overlapping range toward the other side in the nozzle arrangement direction is longer than the length in the nozzle arrangement direction of the portion of the at least one of the plurality of specific images protruding out of the overlapping range toward the one side in the nozzle arrangement direction, the controller shifts the recording position of the at least one of the plurality of specific images toward the other side in the nozzle arrangement direction such that the recording position of the at least one of the plurality of specific images is within the arrangement range of the plurality of nozzles of one of the two head units.

6. The recording apparatus according to claim 4, wherein when the recording command is an instruction to record a plurality of specific images arranged in the nozzle arrangement direction, the controller shifts the recording position of the at least one of the plurality of specific images toward one of the one side and the other side in the nozzle arrangement direction in which the at least one of the plurality of specific images does not overlap with another specific image.

7. The recording apparatus according to claim 4, wherein when the recording command is an instruction to record a plurality of specific images arranged in the nozzle arrangement direction, when the at least one of the plurality of specific images overlaps with another specific image when the recording position of the at least one of the plurality of specific images is shifted in the nozzle arrangement direction, the controller shifts the recording position of the at least one of the plurality of specific images and a recording position of the other specific image in the nozzle arrangement direction so that the at least one of the plurality of specific images does not overlap with the other specific image.

8. The recording apparatus according to claim 1, wherein the specific image is one of a barcode and a two-dimensional code.

9. The recording apparatus according to claim 8, wherein when the recording command is an instruction to record the barcode or the two-dimensional code in an area on a recording medium including an area within the overlapping range in the nozzle arrangement direction,
when a length in the relative displacement direction of a smallest element of the barcode or the two-dimensional code is equal to or shorter than a particular length, the controller controls the two head units to record the barcode or the two-dimensional code using only one of the two head units, and
when the length in the relative displacement direction of the smallest element of the barcode or the two-dimensional code is longer than the particular length, the controller controls the two head units to record the barcode or the two-dimensional code using both of the two head units.

10. The recording apparatus according to claim 9, wherein the particular length is 254 µm.

11. The recording apparatus according to claim 1, wherein when the recording command is an instruction to record a plurality of specific images and to record at least one of the plurality of specific images in an area on a recording medium including an area within the overlapping range in the nozzle arrangement direction:
when a first condition being a condition that a recording position of the at least one of the plurality of specific images in the nozzle arrangement direction is within the arrangement range of the plurality of nozzles of one of the two head units is satisfied, the controller controls the two head units to cause only the plurality of nozzles of the one of the two head units to eject liquid to record the at least one of the plurality of specific images to thereby record the plurality of specific images; and
when the first condition is not satisfied but a second condition being a condition that the recording position of each of the plurality of specific images can be shifted within the arrangement range of the plurality of nozzles of one of the two head units in the nozzle arrangement direction by shifting the recording positions of all the plurality of specific images integrally in the nozzle arrangement direction is satisfied, the controller shifts the recording positions of all the plurality of specific images integrally in the nozzle arrangement direction such that the recording position of each of the plurality of specific images is within the arrangement range of the plurality of nozzles of one of the two head units in the nozzle arrangement direction and controls the two head units to record the plurality of specific images.

12. The recording apparatus according to claim 11, wherein if the first condition and the second condition are not satisfied, the controller shifts the recording position of at least one of the plurality of specific images in the nozzle arrangement direction such that the recording position of the at least one of the plurality of specific images is within the arrangement range of the plurality of nozzles of one of the two head units in the nozzle arrangement direction and controls the two head units to record the plurality of specific images.

13. The recording apparatus according to claim 1, wherein the nozzle arrangement direction is orthogonal to the relative displacement direction.

* * * * *